United States Patent
Gartner et al.

(10) Patent No.: US 12,521,716 B2
(45) Date of Patent: Jan. 13, 2026

(54) MICROFLUIDIC DEVICE AND METHOD FOR USE THEREOF FOR THE SEPARATION, PURIFICATION AND CONCENTRATION OF COMPONENTS OF FLUID MEDIA

(71) Applicant: Mildendo Gesellschaft fur Mikrofluidische Systeme MBH, Jena (DE)

(72) Inventors: Claudia Gartner, Jena (DE); Richard Klemm, Jena (DE); Christian Moche, Jena (DE)

(73) Assignee: Mildendo Gesellschaft fur Mikrofluidische Systeme MBH, Jena (DE)

( * ) Notice: Subject to any disclaimer, the term of this patent is extended or adjusted under 35 U.S.C. 154(b) by 1248 days.

(21) Appl. No.: 17/055,762

(22) PCT Filed: May 16, 2019

(86) PCT No.: PCT/EP2019/062675
§ 371 (c)(1),
(2) Date: Jun. 21, 2021

(87) PCT Pub. No.: WO2019/219841
PCT Pub. Date: Nov. 21, 2019

(65) Prior Publication Data
US 2021/0316308 A1   Oct. 14, 2021

(30) Foreign Application Priority Data
May 16, 2018   (DE) .................. 10 2018 111 834.1

(51) Int. Cl.
*B01L 3/00* (2006.01)
*B01L 7/00* (2006.01)
(Continued)

(52) U.S. Cl.
CPC ........... *B01L 3/502753* (2013.01); *B01L 7/52* (2013.01); *B01L 2200/0684* (2013.01);
(Continued)

(58) Field of Classification Search
None
See application file for complete search history.

(56) References Cited

U.S. PATENT DOCUMENTS

2003/0162304 A1* 8/2003 Dority .................. G01N 1/405
                                                            436/164
2009/0079963 A1   3/2009 Ermantraut et al.
(Continued)

FOREIGN PATENT DOCUMENTS

CN      101300472 A    11/2008
DE      10001116 A1     7/2001
(Continued)

OTHER PUBLICATIONS

Demirci et al., "Simple Filter Microchip for Rapid Separation of Plasma and Viruses from Whole Blood," Int'l Journal of Nanomedicine, Sep. 1, 2012, p. 5019.

*Primary Examiner* — Lore R Jarrett
(74) *Attorney, Agent, or Firm* — Potomac Law Group, PLLC; Vincent M DeLuca; Brian H. Buck

(57) ABSTRACT

The invention relates to a microfluidic device and to a method for use thereof for the separation, purification and concentration of components of fluid media. The invention relates in particular to a microfluidic device and a method for processing blood samples. A microfluidic device is provided, comprising: a structured component (1), which is formed as a flat body; a microfluidic channel system (2), which is configured in the structured component (1); at least one component (3) applied to a surface of the structured component (1); at least one porous functional element (5); and at least one fluidic interface (4.1, 4.2, 4.3), which is
(Continued)

arranged at the structured component (1), for supplying media into the microfluidic channel system (2).

18 Claims, 12 Drawing Sheets

(51) Int. Cl.
  *C12Q 1/6851* (2018.01)
  *C12Q 1/686* (2018.01)

(52) U.S. Cl.
  CPC ... *B01L 2200/0689* (2013.01); *B01L 2200/10* (2013.01); *B01L 2300/048* (2013.01); *B01L 2300/0681* (2013.01); *B01L 2300/0816* (2013.01); *B01L 2400/0487* (2013.01); *B01L 2400/0644* (2013.01); *C12Q 1/6851* (2013.01); *C12Q 1/686* (2013.01)

(56) References Cited

U.S. PATENT DOCUMENTS

| | | |
|---|---|---|
| 2010/0159574 A1 | 6/2010 | Shin et al. |
| 2010/0173394 A1 | 7/2010 | Colston, Jr. et al. |
| 2013/0244241 A1 | 9/2013 | Carrera et al. |
| 2015/0158026 A1 | 6/2015 | Battrell et al. |
| 2016/0279551 A1 | 9/2016 | Foucault |
| 2017/0080422 A1* | 3/2017 | Maaskant .......... B01D 17/0217 |
| 2017/0095818 A1* | 4/2017 | Liu ..................... C12Q 1/6844 |
| 2021/0291182 A1 | 9/2021 | Gollob et al. |

FOREIGN PATENT DOCUMENTS

| | | |
|---|---|---|
| DE | 102005054924 A1 | 5/2007 |
| EP | 1852703 A1 | 11/2007 |
| GB | 2516669 A | 2/2015 |
| RU | 2380418 C1 | 1/2010 |
| RU | 2478431 C2 | 4/2013 |
| RU | 2521639 C2 | 7/2014 |
| RU | 2599657 C2 | 10/2016 |
| WO | 2008055257 A2 | 5/2008 |
| WO | 2015084458 A2 | 6/2015 |

* cited by examiner

Fig. 3 c - d)

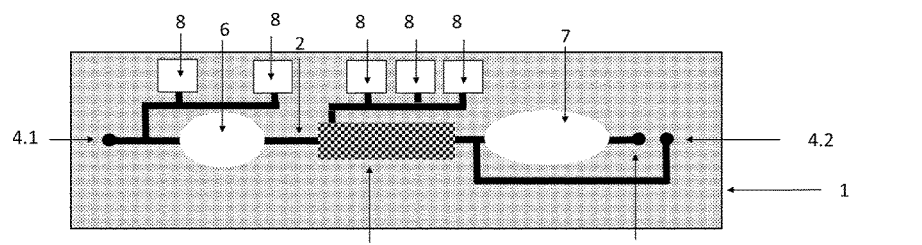
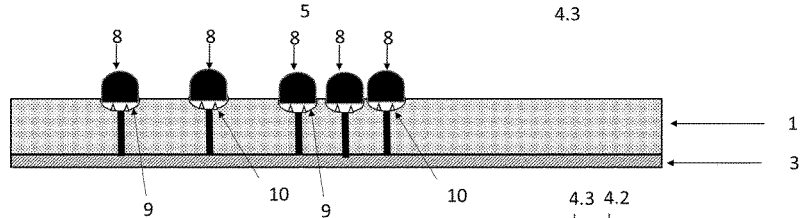
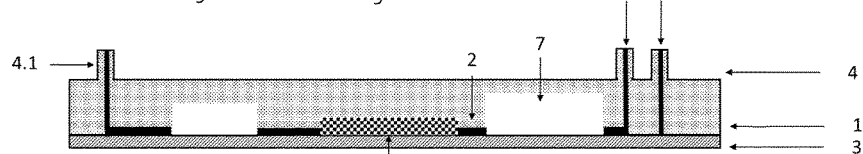
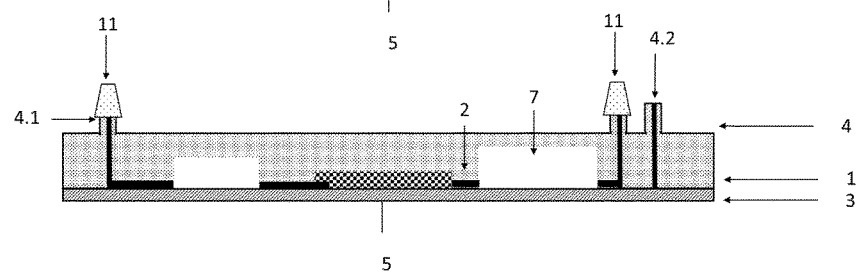
Fig. 4 a)
◀ ─ ─ ─ ─ ─ ─ ─ Fig. 4 b)
◀ ─ ─ ─ ─ ─ ─ ─ Fig. 4 c - d)
Fig. 4 b)
Fig. 4 c)
Fig. 4 d)

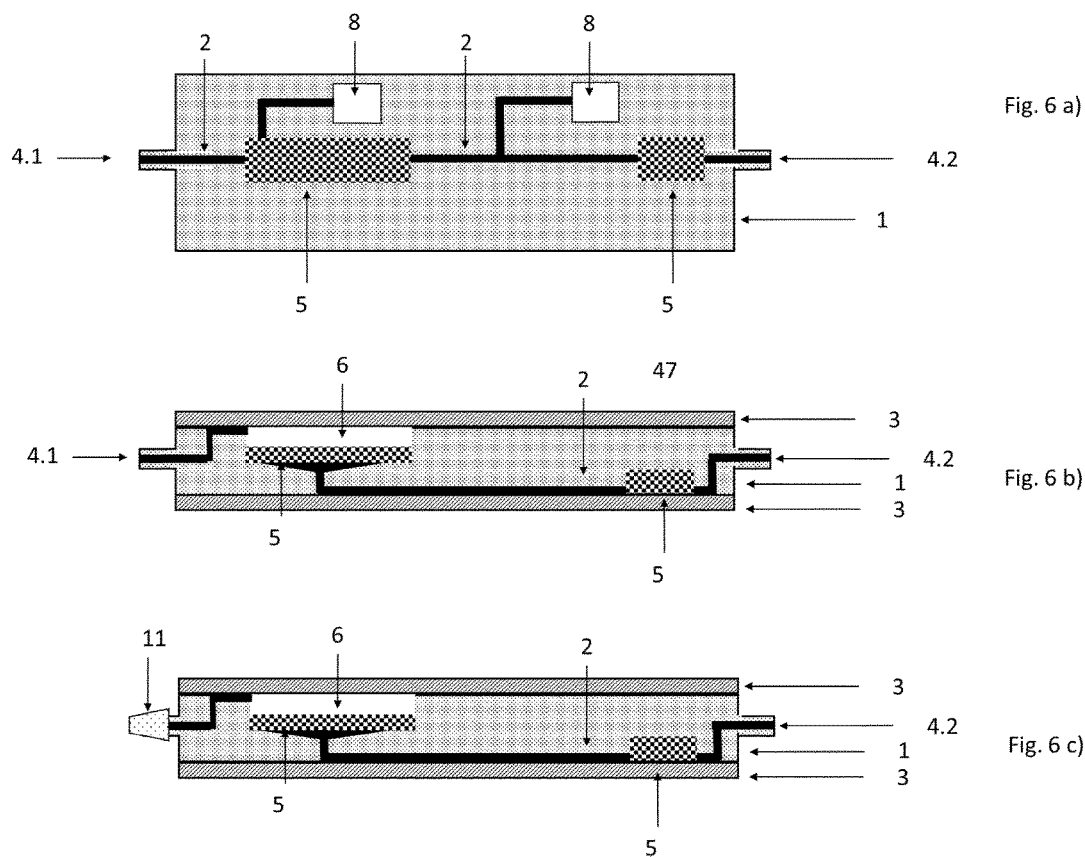
Fig. 6
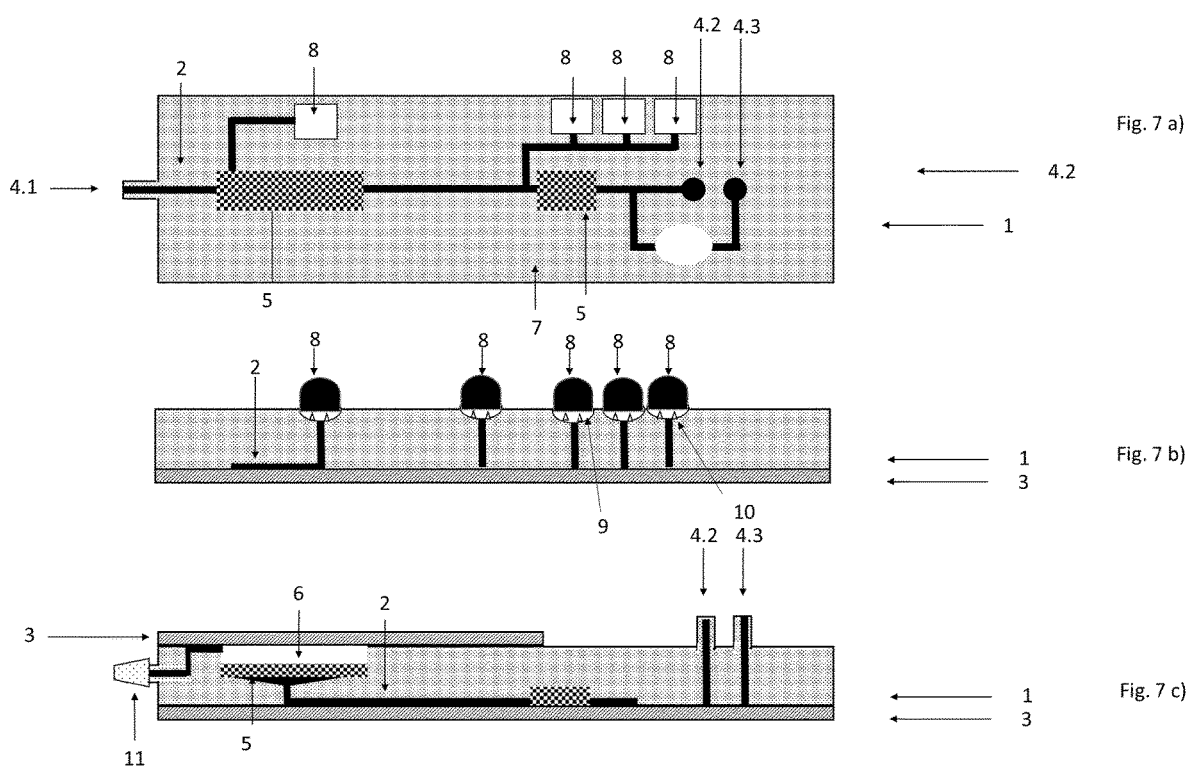

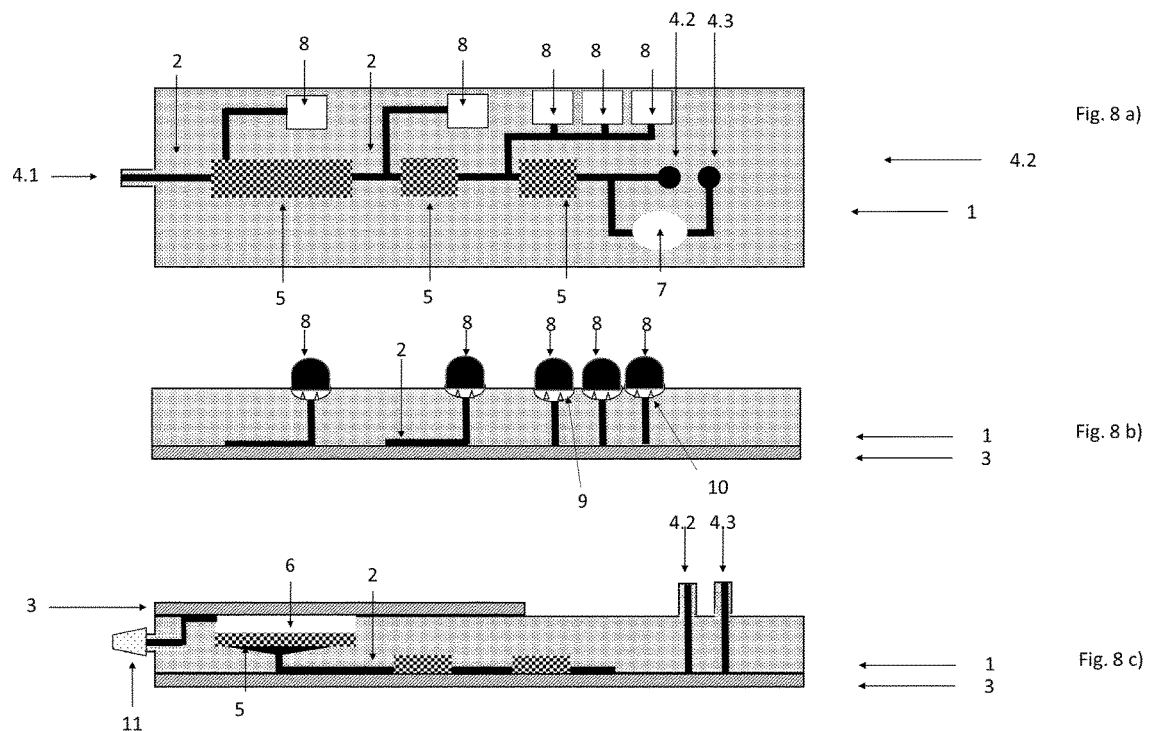
Fig. 8 a)
Fig. 8 b)
Fig. 8 c)
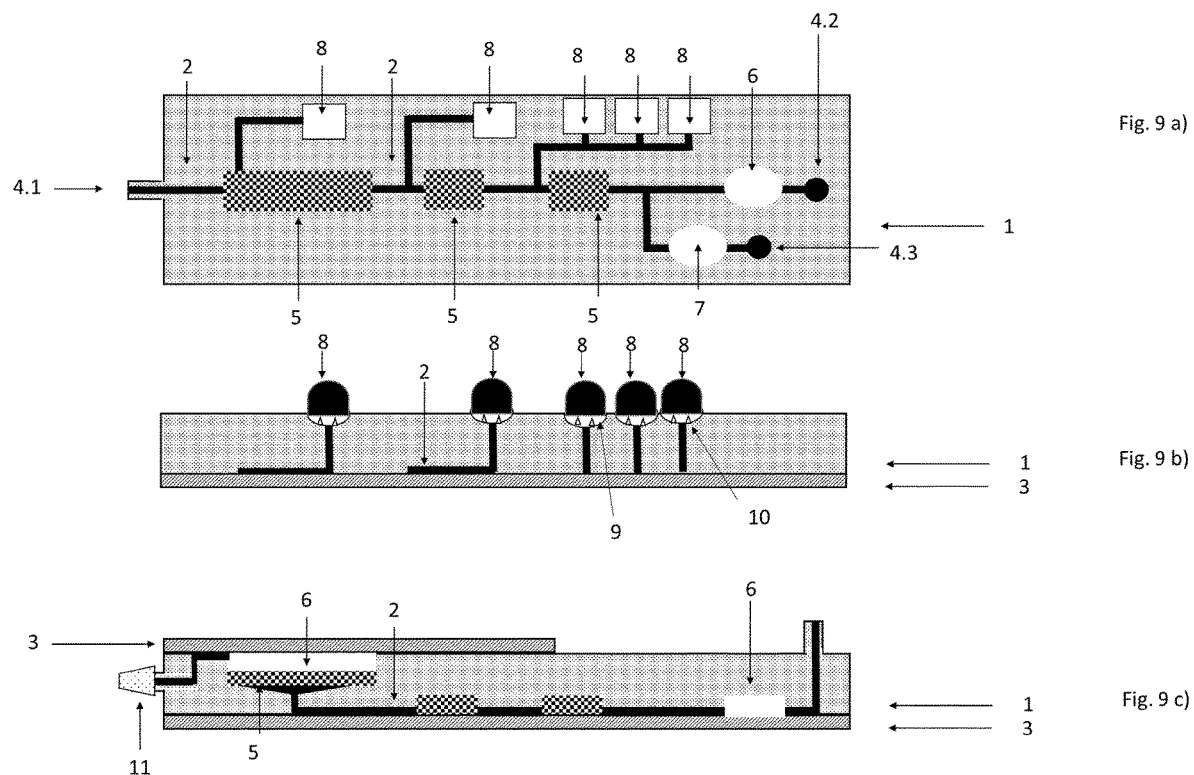
Fig. 9 a)
Fig. 9 b)
Fig. 9 c)

MICROFLUIDIC DEVICE AND METHOD FOR USE THEREOF FOR THE SEPARATION, PURIFICATION AND CONCENTRATION OF COMPONENTS OF FLUID MEDIA

The invention relates to a microfluidic device and to a method for its use in the separation, purification and concentration of components of fluid media. In particular, the invention relates to a microfluidic device and a method for the preparation of blood samples as well as a method for the purification of nucleic acids and a method for the combination of the aforementioned methods with a detection method for the biological ingredients.

BACKGROUND

The separation, purification, fractionation and concentration of components from fluid or gaseous media and the splitting of individual components with subsequent separation, purification, fractionation and concentration of components is conventionally associated with numerous handling steps.

While in chemistry distillation columns, shaking flasks or membranes are used and usually large volumes are handled, in life sciences, for example, smaller volumes are handled and other technologies are used.

In the life sciences, the main technologies are centrifugation and column or particle-based techniques. Here, for example, the sample to be separated is applied to fluid density gradients and different fractions are obtained according to size. Extensive handling steps and centrifugation, often also ultracentrifugation, are disturbing here. Alternatively, sample components are bound to porous surfaces that serve as columns. Centrifugation is used to force the sample through this column, manual washing steps with repeated centrifugation steps make this method complex. Pressure-driven columns with specific or semi-specific binding of target molecules or fractionation according to the size of the target components and their subsequent elution via pressure-driven fluid inflow are further techniques. Alternatively, particles can also be added to fluids or gases. Depending on the surface properties of the particles, sample components can adhere to these particles and be released again via reagents, through temperature or a combination of reagents and temperature. Large automated systems are available for these processes, which are used in particular for the purification of nucleic acids.

To simplify the separation and purification of mostly smaller volumes, there are some developments in the field of microfluidics to use elements like membranes, filters or frits for separation and purification. However, these are often difficult to operate, do not allow the use of the desired sample volume and have few possibilities to sufficiently purify the obtained components for subsequent processes. In addition, the processes necessary to achieve the desired results, e.g. in the field of working with blood or the extraction of nucleic acids, are not fully mapped, so that no system is currently available for routine use.

The object of the invention is therefore to provide a microfluidic device which is easy to manufacture and can be adapted to the sample quantities to be processed as well as to the foregoing and subsequent processes. Furthermore, it is an object to provide a method for its use.

The present invention describes a microfluidic device with a fluidic channel system with at least one fluidic interface. The microfluidic device is configured as a closed unit and has at least one inserted functional element, which is preferably configured as a porous functional element. A sample and/or medium can be passed through the porous functional element. Subsequently, further fluids or gases can be directed through the functional element. This means that the functional element can sequentially perform different tasks in the processing of fluids in a microfluidic system.

The microfluidic device has at least one structured component that forms the main or basic component of the microfluidic device. The structured component is usually formed as a flat and/or often cuboidal body, which can be manufactured by injection molding. Structures are incorporated into this structured component. These include in particular a microfluidic channel system. The channels or part of them are preferably inserted on the top and/or bottom side of the structured component. The structured component can also have fluid reservoirs, channel tapers, valves, switches, distributors, venting membranes, chambers, cavities and/or reaction cavities, which are either incorporated into the structured component or have been inserted into cavities provided for this purpose.

The microfluidic device also has at least one component applied to the structured component. The component can also be configured and called a cover plate. This component is applied to the top and/or bottom side of the structured component. The component can be a partially transparent or partially lightproof plate. However, the component can also be formed as a foil, which is glued, bonded, pressed or welded onto the top and/or bottom side, for example, to make the microfluidic structures fluid-tight and, if required, gas-tight. A foil is preferably made of plastic and has a very small thickness compared to a width and a length, which allows a high flexibility. A preferred thickness here is less than or equal to 1 mm. A plate is less flexible, because the thickness is greater in comparison to the width and length. Therefore, plates with a thickness greater/equal than 1 mm are preferred.

Furthermore, the microfluidic device according to the invention includes at least one porous functional element. The at least one functional element can be realized for example by a filter, a membrane, a frit, or a functional paper or similar elements. The one or more functional elements may include reagents, i.e. the one or more filters, membranes, frits, or functional papers, or the reagents may be applied to them. All these examples of functional elements are at least partially passable for fluids. These can be membranes and/or filters for size exclusion, such as laser structured membranes (track-etch) with exactly defined pore size, silicon sieves, or filter paper with a coarse-meshed net. Functional elements that use size exclusion and/or attachment to the surface of the functional element are various elements such as porous three-dimensional structures like frits, silicon membranes, silica membranes, three-dimensional aggregated particles, filter mats made of various materials, silica mats, PET filters, thin layer chromatography materials or plasma/serum generation membranes, to name a few examples. All these functional elements can be additionally provided with reagents to provide a specific binding of target molecules to these functional elements and a targeted separation of target molecules from functional elements.

The microfluidic device has at least one fluidic interface for the supply of media. Preferably, two fluidic interfaces are arranged at the microfluidic device. The at least one fluidic interface can be arranged vertically, horizontally and/or at an arbitrary angle to the microfluidic device and can be used for the addition of media and/or the application of positive or negative pressure, as well as simply for venting.

Furthermore, the microfluidic device can be closed by using at least one integrated valve, at least one external switch or at least one valve or at least one cap.

The microfluidic device according to the invention serves in particular for the separation, purification, fractionation and concentration of components of a supplied medium or sample.

Preferred embodiments of the microfluidic device include a plurality of functional elements and can optionally have one or more fluid reservoirs.

In accordance with the invention, the microfluidic device is operated with a corresponding method, wherein through the use according to the invention, in addition to separation, purification, fractionation and concentration of components, intermediate reaction steps can also take place in order to obtain, separate and/or concentrate desired target components.

A particularly advantageous embodiment of the microfluidic device is configured as a functional unit or as a microfluidic system.

The microfluidic device can be operated manually or by means of simple devices or equipment that are connected or coupled to the microfluidic device or closed to supply pressure or process media, for example.

An exemplary method for the purification of nucleic acids is provided in which a sample is introduced via the fluidic interface (4.1) and reagents are added in a reaction chamber (6). The cells included in the sample are then lysed. The sample is then passed over a functional element, while the outlet (4.2) is closed and undesired molecules either enter a waste reservoir (7) directly with the sample or are released by flushing/rinsing the functional element (5) with reagents from the fluid reservoirs (8), while the target molecules, nucleic acids, remain on the functional element (5) and are only released by a special reagent from one of the fluid reservoirs (8), wherein the fluid outlet (4.3) at the waste reservoir (7) is closed and the outlet (4.2) is opened in advance and the obtained nucleic acids can be removed from the fluidic system via the now opened outlet (4.2).

Preferably the nucleic acids are DNA or RNA.

In another method for the purification of nucleic acids, a sample is supplied via the fluidic interface (4.1) and is filtered by a functional element (5), so that the cells remain behind and undesired components get into the waste reservoir (7) whose fluidic interface (4.3) is opened, which is achieved by closing the fluidic interfaces (4.2 and 4.3) behind the second functional element (5) in the flow direction, followed by lysis of the cells by contact of the cells with reagents in the cavity (6) above the first functional element (5), followed by transport of the lysate by fluids from one of the reagent reservoirs (8) connected to the first functional element (5), followed by transport of the lysate to the second functional element (5), wherein now the fluidic interface (4.3) behind the second functional element (5) is opened and the other fluidic interfaces are closed, wherein the target molecules and further molecules bind to the functional element (5) and by flushing with fluids from the reagent reservoirs (8) a separation of undesired molecules takes place and finally after closing the fluidic interface (4.3) and opening of the fluid outlet (4.2), the nucleic acids are released by a reagent and the eluate is expelled and removed from the fluid outlet (4.2).

In a preferred method for the purification of nucleic acids, a sample is supplied via the fluidic interface (4.1) and is filtered by a functional element (5), so that the cells remain behind and undesired components get into the waste reservoir (7) whose fluidic interface (4.3) is opened, which is achieved by closing the fluidic interfaces (4.2 and 4.3) behind the second functional element (5) in the flow direction, followed by lysis of the cells by contact of the cells with reagents in the cavity (6) above the first functional element (5), followed by transport of the lysate by fluids from one of the reagent reservoirs (8) connected to the first functional element (5), followed by transport of the lysate to the second functional element (5), wherein now the fluidic interface (4.3) behind the second functional element (5) is opened and the other fluidic interfaces are closed, wherein the target molecules and further molecules bind to the functional element (5) and by flushing with fluids from the reagent reservoirs (8) a separation of undesired molecules takes place and finally after closing the fluidic interface (4.3) and opening of the fluid outlet (4.2), the nucleic acids are released by a reagent and the eluate is expelled and removed from the fluid outlet (4.2), wherein the nucleic acid is DNA or the nucleic acid is RNA.

The purified nucleic acid can be subjected to subsequent amplification and detection.

The purified nucleic acid can be an RNA and then be subjected first to reverse transcription and then to amplification and detection.

All reagents can be provided in fluid or dry form on the microfluidic system.

The purified nucleic acid can be DNA and can be amplified and detected by qPCR and/or amplified and detected by isothermal amplification.

The purified nucleic acid can be DNA, which is pre-amplified in a first chamber (20) by a non-specific PCR and then detected in a specific qPCR.

The purified nucleic acid can be RNA, which is subjected to reverse transcription in a first chamber (20) and amplified and detected by qPCR in a second chamber (20).

The purified nucleic acid can be RNA, which is subjected in one chamber (20) to both reverse transcription and qPCR (one-step RT-PCR).

A plurality of parallel qPCR chambers (20) can be arranged to run the qPCR in parallel PCR chambers.

The qPCR can run as duplex PCR with internal control amplification and/or the qPCR can run as multiplex PCR with internal control amplification.

Preferably, this is a conventional PCR, which can optionally be detected subsequently via an array using hybridization.

In the following, the invention is described in more detail by means of figures. In the figures:

FIG. 4a shows a fourth embodiment of the microfluidic device in a top view;

FIG. 4b shows the fourth embodiment of FIG. 4a in a sectional view along the line 4b;

FIG. 4c shows the fourth embodiment of FIG. 4a in a sectional view along the line 4cd;

FIG. 4d shows the fourth embodiment with caps as shown in FIG. 4a in a sectional view along the line 4cd;

FIG. 6a shows a sixth embodiment of the microfluidic device in a top view;

FIG. 6b shows the sixth embodiment of FIG. 6a in a sectional view along the undrawn line from the inlet to the outlet;

FIG. 6c shows the sixth embodiment with caps as shown in FIG. 6a in a sectional view along the undrawn line from the inlet to the outlet;

FIG. 7a shows a seventh embodiment of the microfluidic device in a top view;

FIG. 7b shows the seventh embodiment of FIG. 7a in a sectional view along the undrawn line through the fluid reservoirs;

FIG. 7c shows the seventh embodiment with caps as shown in FIG. 7a in a sectional view along the undrawn line from the inlet to the outlet;

FIG. 8a shows an eighth embodiment of the microfluidic device according to the invention in a top view;

FIG. 8b shows the eighth embodiment of FIG. 8a in a sectional view along the undrawn line through the fluid reservoirs;

FIG. 8c shows the eighth embodiment with caps as shown in FIG. 8a in a sectional view along the undrawn line from the inlet to the outlet;

FIG. 9a shows a ninth embodiment of the microfluidic device in a top view;

FIG. 9b shows the ninth embodiment of FIG. 9a in a sectional view along the undrawn finish through the fluid reservoirs;

FIG. 9c shows the ninth embodiment with caps as shown in FIG. 9a in a sectional view along the unmarked line from inlet to outlet;

Figure 1:
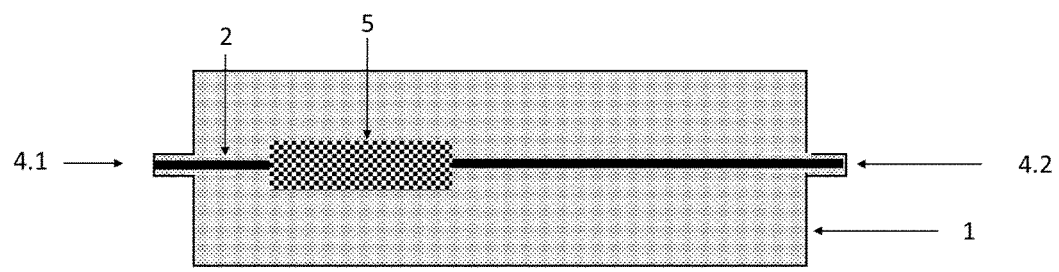
FIG. 1a shows a first embodiment of the microfluidic device in a top view.
FIG. 1b shows the first embodiment of FIG. 1a in a sectional view along a undrawn line from inlet to outlet.
Figure 1:
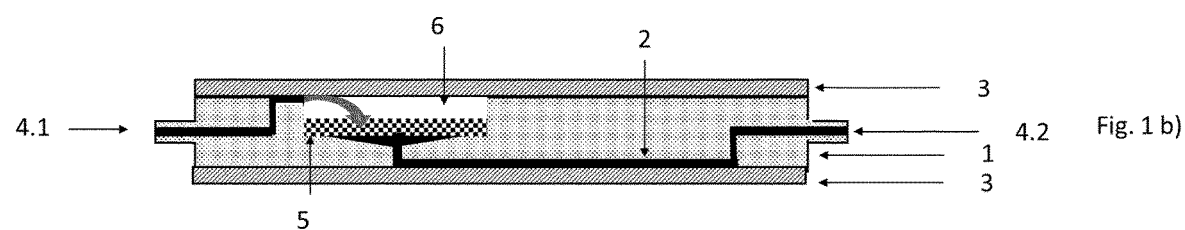
Figure 2:
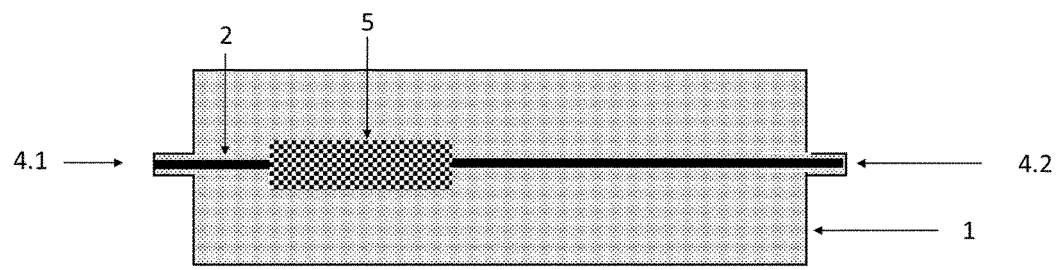
FIG. 2a shows a second embodiment of the microfluidic device in a top view.
FIG. 2b shows the second embodiment of FIG. 2a in a sectional view along a undrawn line from the inlet to the outlet.
Figure 2:
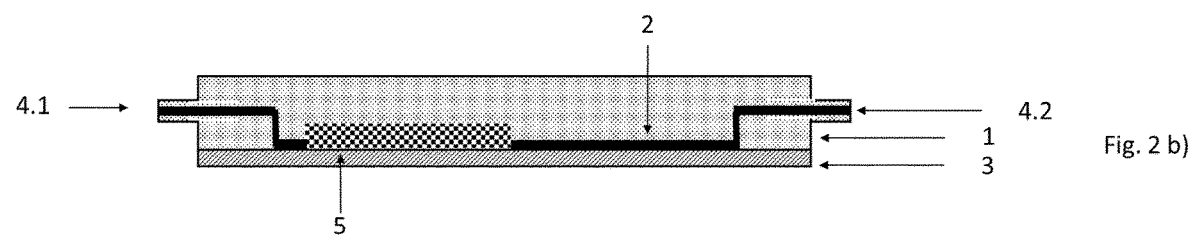
Figure 3:
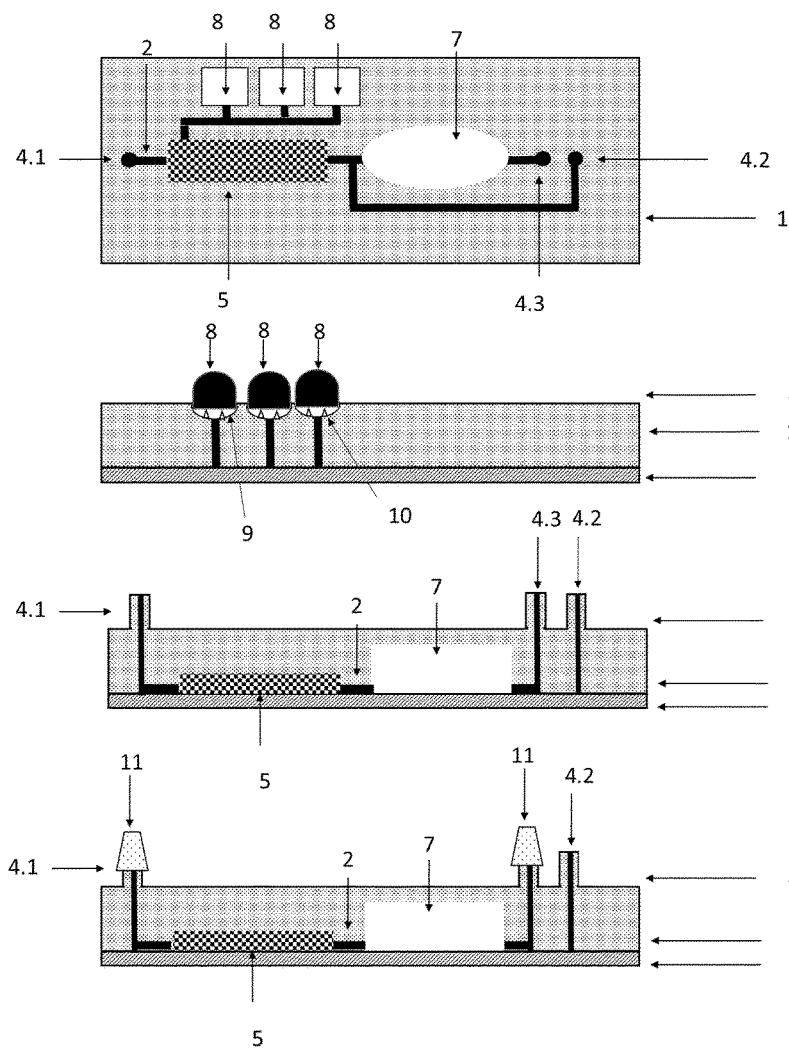
FIG. 3a shows a third embodiment of the microfluidic device in a top view.
FIG. 3b shows the third embodiment of FIG. 3a in a sectional view along the line 3b.
FIG. 3c shows the third embodiment of FIG. 3a in a sectional view along the line 3cd.
FIG. 3d shows the third embodiment with caps as shown in FIG. 3a in a sectional view along the line 3cd.
Figure 5:
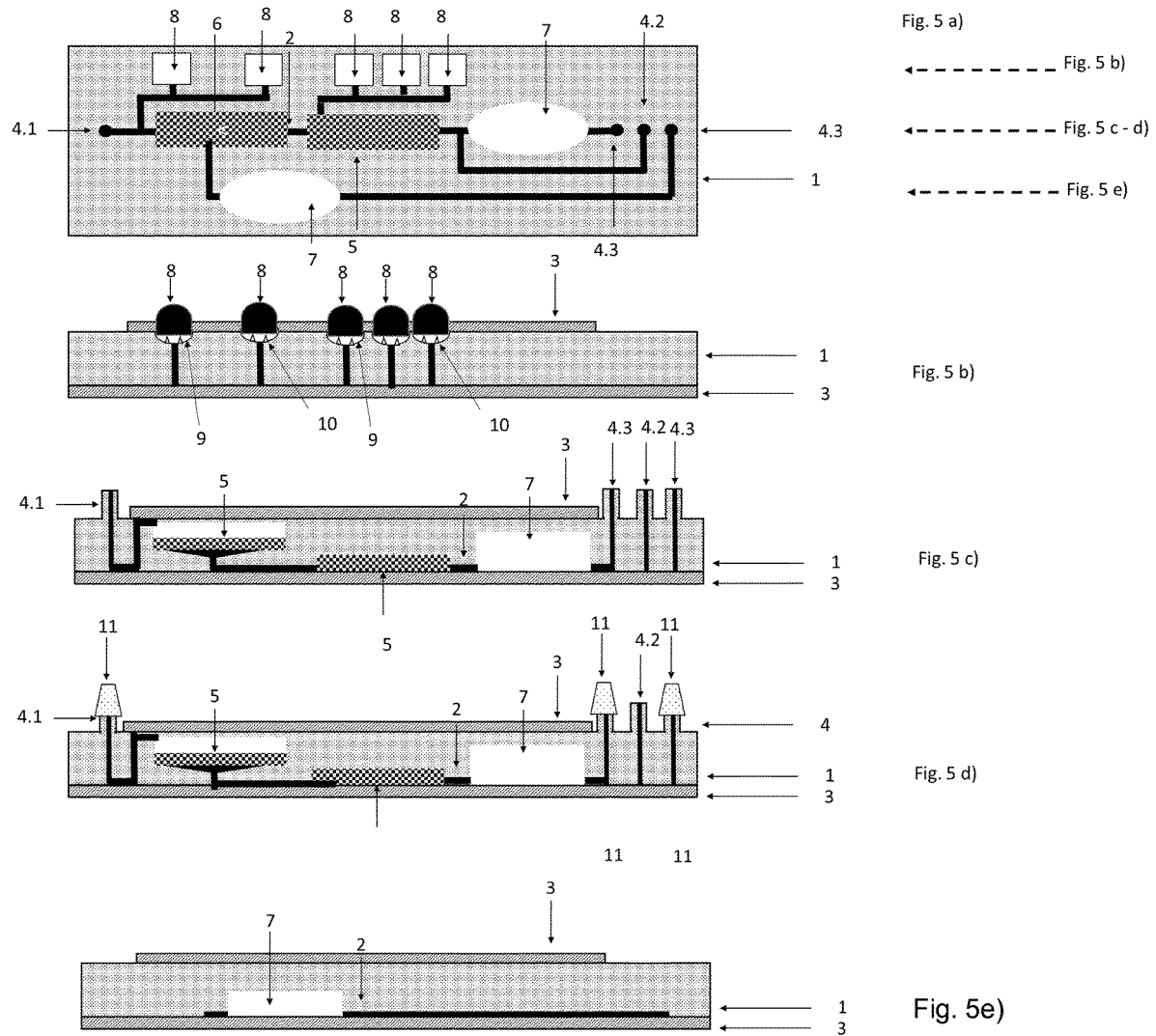
FIG. 5a shows a fifth embodiment of the microfluidic device of the invention in a top view.
FIG. 5b shows the fifth embodiment of FIG. 5a in a sectional view along the line 5b.
FIG. 5c shows the fifth embodiment of FIG. 5a in a sectional view along the line 5cd.
FIG. 5d shows the fifth embodiment with caps as shown in FIG. 5a in a sectional view along the line 4cd.
FIG. 5e shows the fifth embodiment with caps as shown in FIG. 5a in a sectional view along the line 5e.

The basic embodiment of the microfluidic device is shown in FIGS. 1 and 2. The microfluidic device has two fluidic interfaces 4.1. and 4.2. A structured component 1 is configured as a flat or cuboidal component and has two fluidic interfaces 4.1. and 4.2 on its sides or front sides. Furthermore, a fluidic channel system 2 is integrated or inserted into the structured component 1. A further component 3 closes a top side of the structured component 1 so that the fluidic channel system 2 and the fluidic structures are sealed fluid-tight and, if gases are used as medium, also gas-tight.

Furthermore, a functional element 5, preferably a porous functional element 5, is arranged at or in the structured component 1. The flow through the porous functional element 5 can be vertical, see FIG. 1b, or horizontal, see FIG. 2b. A bidirectional flow in both directions is also possible. The functional element 5 can either be integrated directly with the structured component 1 via the manufacturing process of the structured component 1, e.g. in the injection molding process by inserting the functional element, or it can be subsequently inserted into the microfluidic device. In FIG. 1, the functional element 5 is inserted into a cavity 6 and is flowed through from above, i.e. vertically, wherein the channel 2 after the functional element 5 is formed on the bottom side of the structured component 1 and is closed there by another component 3 analogous to the top component 3. A cavity 6 remains above the functional element 5, into which the medium flows laterally coming from the fluidic interface 4.1.

Alternatively, in FIG. 2b, the channel 2 extends first as an extension of the fluidic interface 4.1, and then continues on the bottom side of the structured component 1. Again, the channel 2 is closed by another component 3. A cavity is formed on the bottom side of the structured component 1 into which the functional element 5 is or will be inserted so that it can be flowed through horizontally and the fluid flows to the opposite fluidic interface 4.2 to be discharged there.

The method for using the microfluidic device is such that a sample is introduced via the fluidic interface 4.1, leaving some predetermined components of the sample in the functional element 5. This is achieved by the predetermined particle size of the functional element 5. Subsequently, a rinsing of the functional element 5 can be performed, wherein various reagents or air are rinsed through the functional element 5. Afterwards, the target component can be flushed out of the functional element 5, which can be done by special reagents, pressure, temperature or a combination of these methods.

Particularly advantageous is re-pressurization with a displacement medium, especially advantageous are oils or higher viscosity media than the previous fluids, wherein the same fluids can also be used, after the target component has been separated from the functional element 5 in order to achieve quantitative flushing of the target component.

This method allows the target component in the eluate obtained to be not only purified but also enriched in comparison to the original medium. Flow-through with different media thus also enables fractionation, i.e. the elution of different components of the original medium, from the functional element 5.

Another embodiment of the microfluidic device is shown in FIGS. 3a-3d. Here, the microfluidic device has been supplemented with reagent reservoirs 8. The structured component 1 includes a fluidic channel system 2, and the further component 3 at the bottom side, which seals the fluidic structures fluid-tight and, when using gases as medium, also gas-tight, and a functional element 5, preferably a porous functional element, which is located at or in the structured component 1, as well as three fluidic interfaces 4.1, 4.2, 4.3, wherein the sample (medium) supplied via the fluidic interface 4.1 located at the top side as well as the reagents stored in the reagent reservoirs 8 can flow through the functional element 5 in any order and the fluid flow or the discharge of the fluid can be controlled by selectively closing the fluidic interfaces 4.1, 4.2 and 4.3 with caps 11 (see FIG. 3d). The reagent reservoirs 8 can be configured as blisters, wherein predefined fluids are stored in encapsulated containers. This means the three reagent reservoirs 8 can include different types of fluids and/or different amounts of these fluids in order to be able to add them specifically for the treatment of the sample. At the blister seat 9 there are small tips 10 which, when the blister is actuated (pressed in), cause the encapsulated containers to open so that the fluid can be safely supplied to the channel system 2 or the functional element 5.

The fluid can be kept in a waste chamber 7 of the microfluidic device or be led outside via the fluidic interface 4.3 at the top side. By closing the fluidic interfaces 4.1 and 4.3 with a cap 11 each, the fluid can also be removed via the fluidic interface 4.2, which is then opened. Thus, a target fluid can be removed, whereas when the sample is applied through the fluidic interface 4.1, it is subsequently closed by a cap.

The functional element 5 can either be integrated directly with the structured component 1 during the manufacturing process of the structured component, e.g. in the injection molding process by inserting functional element 5, or it can be inserted subsequently.

The method for using the microfluidic device is such that the sample is introduced via the fluidic interface 4.1, the fluidic interface 4.1 is closed after the sample has been introduced, and the fluidic interface 4.3 is also closed by a cap 11 for the removal of the waste. Components of the sample remain in the functional element 5. Afterwards, the functional element 5 can be rinsed out, wherein various reagents or air are rinsed through the functional element 5. In the next step, the target component is rinsed out of the functional element 5, which can be done by special reagents, pressure, temperature or a combination of these methods, wherein the unwanted fractions are either stored in the waste chamber 7 or rinsed out of the microfluidic device via the fluidic interface 4.3. Target components are then obtained via the fluidic interface 4.2, wherein a re-pressurization with a displacement medium after the target component has been separated from the functional element 5 is particularly advantageous in order to obtain a quantitative flushing out of the target component, so that via this method the target component in the obtained eluate can not only be purified but also enriched in comparison to the original medium. In addition, the flow of different media allows fractionation, i.e. the elution of different components of the original medium from the functional element 5.

In a preferred embodiment, the microfluidic device can have valves in the fluidic channel system 2, which can be configured as membrane valves, rotary valves or other valves, and which are configured to close off the channel system 2 or parts of it, e.g. to decouple a section of the microfluidic device for a certain time or reaction or processing operation and thus to direct the fluid within the microfluidic device selectively into other areas of the channel system or to other further functional elements 5 or to a certain fluidic interface 4.1, 4.2, 4.3.

In a preferred configuration, the microfluidic device can have an upstream reaction chamber 6, as shown in FIG. 4a. In the microfluidic device shown in FIGS. 4a-4d, the structured component 1 has a fluidic channel system 2, which is located at the bottom side of the structured component 1. The bottom side of the structured component 1 and the fluidic channel system 2 therein is sealed fluid-tight with the other component 3 and also gas-tight when using gases as medium.

Between the fluidic interface 4.1, which serves as an inlet and is located on the top side of the structured component 1, and the functional element 5, which is preferably a porous functional element 5, a cavity or reaction chamber 6 is located as part of the fluidic system. The microfluidic device according to FIGS. 4a-4d has a plurality of reagent reservoirs 8, at least one of which can provide a fluid supply before the cavity 6. Similarly, a fluid supply after the cavity 6 but before the functional element 5 is possible, which is not shown here. Three further reagent reservoirs 8 are arranged in such a way that a fluid or reagent supply to the functional element 5 is possible, i.e. the reagent reservoirs 8 release their media into the functional element 5. The addition can be carried out with a time delay.

The microfluidic device according to FIGS. 4a-4d has further fluidic interfaces, of which one fluidic interface 4.3 is connected behind a chamber 7 and another fluidic interface 4.2 is connected in parallel to the chamber 7.

Via the fluidic interface 4.1 (FIG. 4d), which is to be closed afterwards, the sample reaches cavity 6 and is mixed with a reagent from a reagent reservoir 8. The resulting fluid is then passed over the functional element 5, wherein the functional element 5 can be passed through both by the media from the cavity/reaction chamber 6 and by reagents from other reagent reservoirs 8 in any order.

The fluid flow can be controlled by selectively closing the fluidic interfaces 4.1, 4.2, 4.3 with caps 11.

The fluid can be held in the waste chamber 7 in the microfluidic device or can be discharged to the outside via the fluidic interface 4.3 connected to the chamber 7 at the top of the structured component 1.

By closing the fluidic interfaces 4.1 and 4.3, fluid can then be discharged via the open fluidic interface 4.2, e.g. for a removal of a target fluid, whereas when the sample is applied via the fluidic interface 4.1, it is subsequently closed.

In a preferred embodiment, the microfluidic device may have an additional functional element 5, as shown in FIGS. 5*a*-*d*. In this configuration, a plurality of reagent reservoirs 8 are provided which can supply fluids or media before the first functional element 5 or supply fluid s to the second functional element 5. The first and second functional elements 5 are connected in series. The microfluidic device has two chambers 7, one of which is coupled to the first functional element 5 and is provided with a fluidic interface 4.4. A first fluidic interface 4.1 is arranged at the top side of the structured component 1 and is connected via the channel system 2 to the first functional element 5, which is vertically flowed through. The second functional element 5, which is connected to the second chamber 7, is arranged at the bottom side of the structured component 1.

The second chamber 7 is connected to the fluidic interface 4.3, wherein a channel branch to the fluidic interface 4.2 is arranged before the second chamber 7.

The structured component 1 is covered here with two further components 3, which close the fluidic channel system 2 fluid-tight and, when using gases as medium, also gas-tight. The top component 3 does not cover the top side of the structured component 1 completely, so that the plurality of fluidic interfaces 4.1, 4.2, 4.3 and 4.4 are not covered by the top component 3. The bottom component completely covers the structured component 1.

Via the fluidic interface 4.1, which is to be closed, the sample enters the cavity/reaction chamber 6, in which the first functional element 5 is located. Particles are retained by the first functional element 5 and are guided through the fluidic channel system 2 to the second functional element 5 by closing the fluidic interface 4.1 and from there via the chamber 7 to the fluidic interface 4.3 or directly out of the microfluidic device via the fluidic interface 4.4. Subsequently, a reagent supply causes a reaction with particles, so that smaller particles now reach the second functional element 5 by opening the fluidic channel system 2 and target molecules can be held on it, and target molecules can be eluted after the reagent supply from the reagent reservoirs 8, whereas fractions to be discarded can be stored in the second chamber or waste reservoir 7 or flushed out of the microfluidic device.

In some embodiments, the microfluidic device may be configured as shown in FIGS. 6*a*-6*c* with two functional elements 5 connected in series. The first functional element 5 is arranged in a cavity 6 and is flowed through from above, i.e. vertically. The first functional element 5 is coupled with a reagent reservoir 8. The second functional element 5 is arranged at the bottom side and coupled to the outlet of the first functional element 5 via the channel system 2, with a further reagent reservoir 8 for additional fluid supply being connected in between.

The first functional element 5 receives the sample via the fluidic interface 4.1. The sample then either passes through the first functional element 5 on its own or is driven further into the second functional element 5 by reagents from the reagent reservoir 8. The eluate is then removed from the microfluidic device through the second functional element 5 via the fluidic interface 4.2.

Reagents can be moved from the reagent reservoir 8, which meets the fluidic channel system 2 before the first functional element 5 or from the reagent reservoir 8, which meets the fluidic channel system 2 before the second functional element 5.

The first functional element 5 is a unit for the generation of plasma or serum from blood and the second functional element 5 is used to remove hemolyzed red blood cells.

This embodiment according to FIGS. 6*a*-6*c* allows, by combining two functional elements 5, to supply larger volumes of the sample via the first functional element 5 and to remove interfering components by the second functional element 5, so that both the problem of generating larger plasma/serum volumes on a microfluidic chip is solved by a further step and, in addition, blood samples that already show aging effects or generally already have lysed red blood cells can be used.

In the embodiment according to FIGS. 7*a*-7*c*, the microfluidic device has two functional elements 5 connected in series, wherein the first functional element 5 is exposed to the sample via the fluidic interface 4.1.

The sample then either flows independently through the first functional element 5 or is driven further into the second functional element 5 by reagents from the first assigned reagent reservoir 8.

The second functional element 5 then allows the eluate to be discharged from the device via the fluidic interface 4.2, wherein reagents can be moved from the reagent reservoir 8, which enters the fluidic channel system 2 before the first functional element 5, or from the reagent reservoir, which enters the fluidic channel system 2 only before the second functional element 5.

In this arrangement, the first functional element 5 is a unit for the generation of plasma or serum from blood, whereas the second functional element 5 is used for the extraction of nucleic acids from the obtained plasma/serum.

The reagent reservoir 8 is connected to the first functional element 5 for diluting and expelling the plasma/serum.

The reagent reservoirs 8 upstream of the second functional element 5 are used to expel unwanted components and to separate the target component.

To improve the separation of the target component, heat can be supplied to increase the separation.

The fluid flow within the microfluidic device is enabled by opening and closing the corresponding fluidic interfaces 4.1, 4.2 and 4.3, so that the target fraction can be obtained cleanly via one of the fluidic interfaces 4.2 or 4.3 or can be transported directly into adjacent areas of the fluidic channel system 2.

The microfluidic device shown in FIGS. 8*a*-8*c* is described below. Three functional elements 5 are connected in series, wherein the first functional element 5 is supplied with the sample via the fluidic interface 4.1.

The sample then either flows autonomously through the first functional element 5 or is driven further to the second functional element 5 by reagents from the first reagent reservoir 8, wherein the process step is repeated at the second functional element 5 and the eluate is then passed by the third functional element 5, wherein one part remains on the third functional element 5 and undesired components can be washed out via the reagent reservoirs 8 and either remain in the waste chamber 7 or are discharged via one of the fluidic interfaces 4.2 or 4.3.

The desired component can be obtained by closing the part of the fluidic channel system 2 that is directly connected to the waste reservoir 7 via the fluidic interface 4.2 or it can be routed to a further processing in the fluidic channel system 2.

In the following, the microfluidic device according to FIGS. 9*a*-9*c* is described, which is configured similar to FIGS. 8*a*-8*c*, wherein an additional detection chamber 6 is available. The detection chamber is covered by an at least partially transparent portion of the component 3 or the structured component 1 is at least partially transparent in the area of the detection chamber 6 in order to be able to visually check the condition of the eluate.

Here, too, three functional elements 5 are arranged in series, wherein the first functional element 5 is exposed to the sample via the fluidic interface 4.1.

The sample then either flows through the functional element 5 on its own or is driven further to the second functional element 5 by reagents from the first reagent reservoir 8, wherein the process step is repeated at the second functional element 5 and the eluate is then passed over the third functional element 5, wherein part of the eluate remains on the third functional element 5 and undesired components are washed out by the reagents of the reagent reservoirs 8 and either remain in the waste chamber 7 or are discharged.

The desired component can be obtained by closing the part of the fluidic channel system 2 that is directly connected to the waste reservoir 7 and can either be removed via the fluidic interface 4.2 or be passed on to another function in the fluidic channel system 2.

The eluate then leaves the device through the second functional element 5 via the fluidic interface, outlet 4.2, wherein reagents can be moved from the reagent reservoir 8, which is connected to the fluidic channel system 2 before the first functional element 5, or from the reagent reservoir, which only meets the fluidic channel system 2 before the second functional element 5. The first functional element 5 is a unit for generating plasma or serum from blood. The second functional element 5 is used for the extraction of nucleic acids from the obtained plasma/serum. The reagent reservoir 8 connected to the first functional element 5 is provided for diluting and expelling the obtained plasma/serum. The reagent reservoirs 8 provided upstream of the second functional element 5 are used to expel unwanted components and to remove the target component. The separation of the target component can also be enhanced by the addition of temperature. Fluid guidance is enabled by opening and closing the corresponding fluidic interfaces, so that the target fraction can be obtained cleanly via a fluidic interface 4.2 or 4.3 or can be transported directly into adjacent areas of the fluidic channel system 2.

Figure 10:
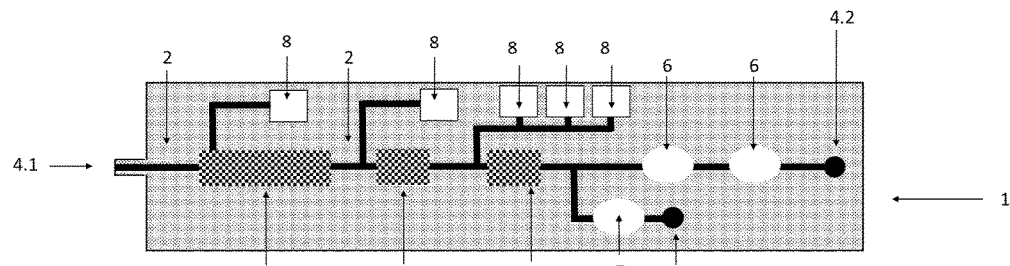
FIG. 10a shows a tenth embodiment of the microfluidic device invention in a top view.
FIG. 10b shows the tenth embodiment of FIG. 10a in a sectional view along the undrawn line through the fluid reservoirs.
FIG. 10c shows the tenth embodiment with caps as shown in FIG. 10a in a sectional view along the undrawn line from the inlet to the outlet.
Figure 10:
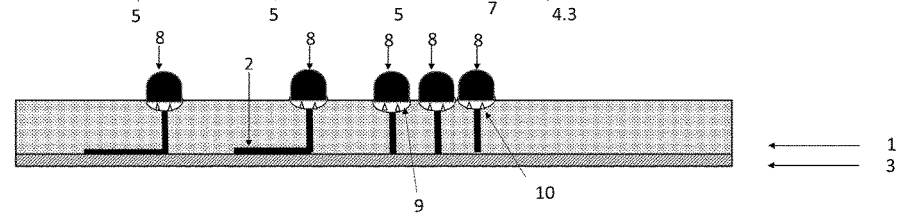
Figure 10:
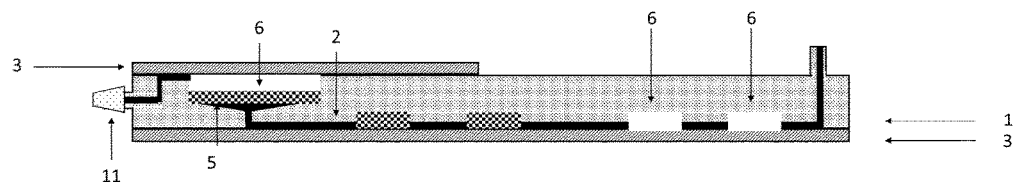

The embodiment according to FIGS. 10*a*-10*c* is similar to the embodiment according to FIGS. 9*a*-9*c*. Here, there is an additional second detection chamber 6. By adding indicator solutions from one of the reagent reservoirs 8, optically recognizable reactions, e.g. color changes, can be generated, which can then be observed in one of the two detection chambers 6.

Figure 11:
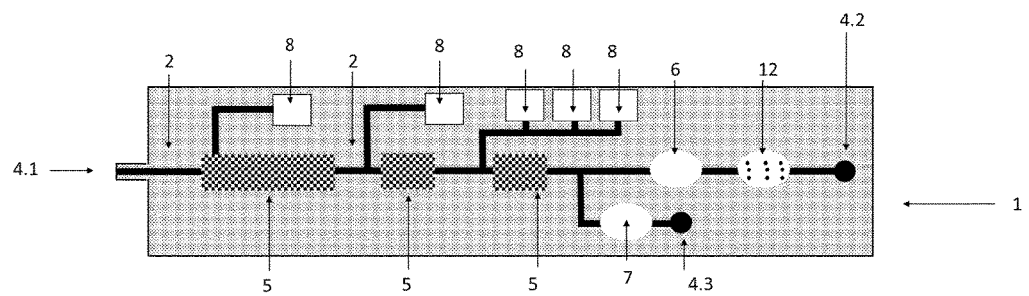
FIG. 11a shows an eleventh embodiment of the microfluidic device of the invention in a top view.
FIG. 11b shows the eleventh embodiment of FIG. 11a in a sectional view along the undrawn line through the fluid reservoirs.
FIG. 11c shows the eleventh embodiment with caps as shown in FIG. 11a in a sectional view along the undrawn line from the inlet to the outlet.
Figure 11:
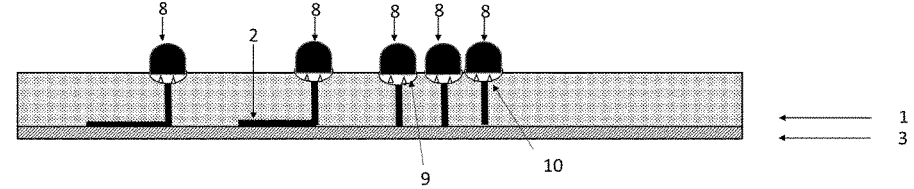
Figure 11:
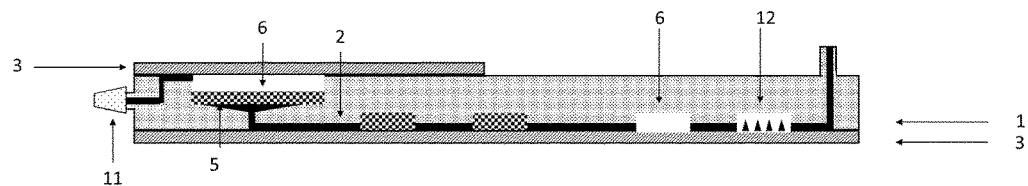

The embodiment according to FIGS. 11*a*-11*c* is similar to the embodiment according to FIGS. 10*a*-10*c*. Here, an array of reagents is arranged in the second detection chamber. These reagents cause a reaction of the eluate, which can then be visually perceived.

Figure 12:
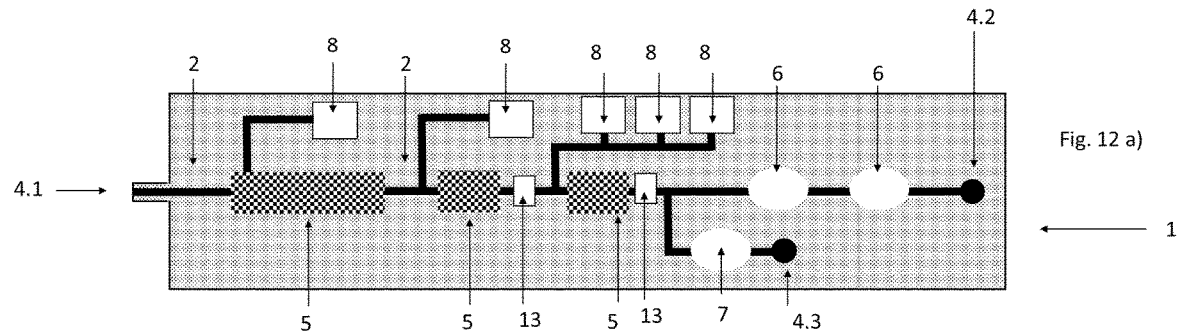
FIG. 12a shows a twelfth embodiment of the microfluidic device according to the invention in a top view.

The embodiment according to FIG. 12 shows exemplary measuring windows 13, which can be read out optically and preferably have several measuring depths to extend the dynamic range of the measurement. The use for concentration determinations of eluted samples, e.g. the concentration determination of eluted nucleic acids or proteins, is particularly advantageous. A respective measuring window 13 is arranged behind the second and third functional element 5.

The embodiment according to FIGS. 13*a*-13*c* is a fluidic system with a directly coupled syringe pump 14, 15, which is formed in one piece with the structured component 1 or can be manufactured separately. The syringe pump includes a body 14 and a plunger 15. The syringe pump can be operated by the plunger 15 and can be used for fluid storage, waste collection during use of the fluidic system, and fluid control during use of the fluidic system. The syringe pump is connected to the channel system 2.

Figure 13:
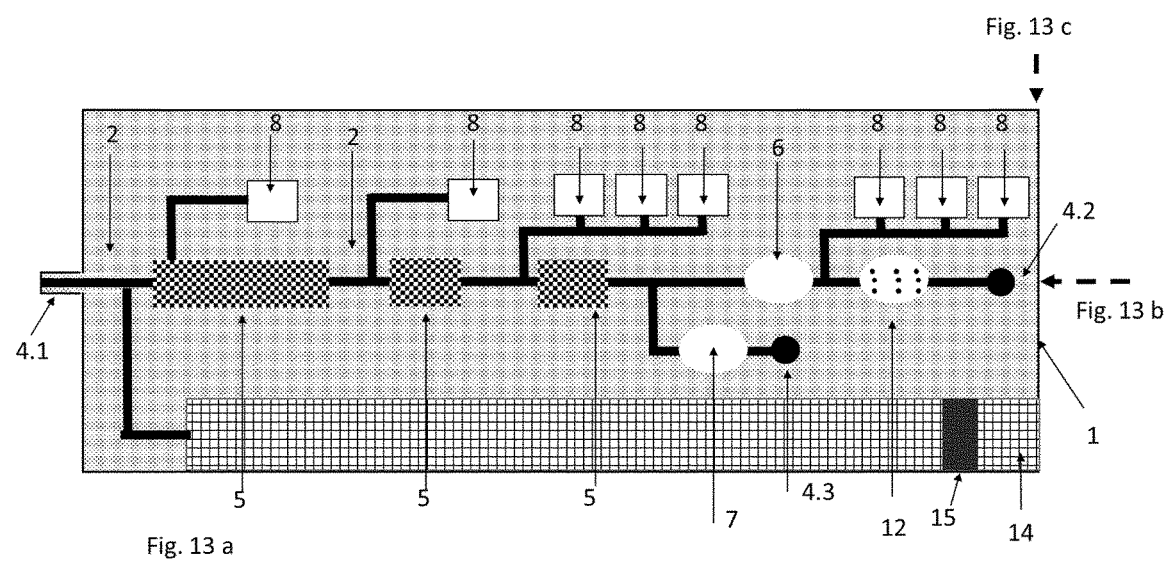
FIG. 13a shows a thirteenth embodiment of the microfluidic device according to the invention in a top view.
FIG. 13b shows a thirteenth embodiment of the microfluidic device according to the invention in cross-section 1.
FIG. 13c shows a fourteenth embodiment of the microfluidic device according to the invention in cross-section 2.
Figure 13:
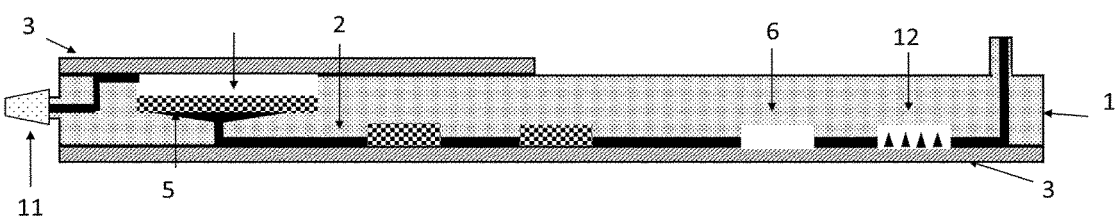
Figure 13:
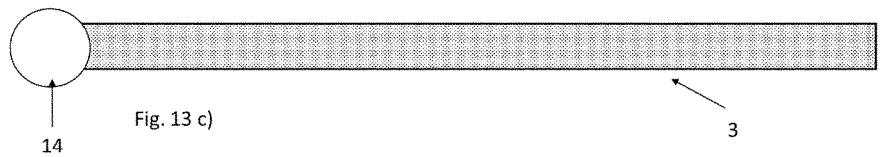

The embodiment according to FIGS. 14*a*-14*c* includes, in addition to the components of the embodiment of FIG. 13, a rotary valve 16, which can switch the individual sections of the fluidic network or channel lines, here exemplarily starting from the syringe pump 14, so that sections can be fluidically controlled separately or together. FIG. 14*b* shows a sectional view along line 14*b* and FIG. 14*c* a view along line 14*c*.

Figure 14:
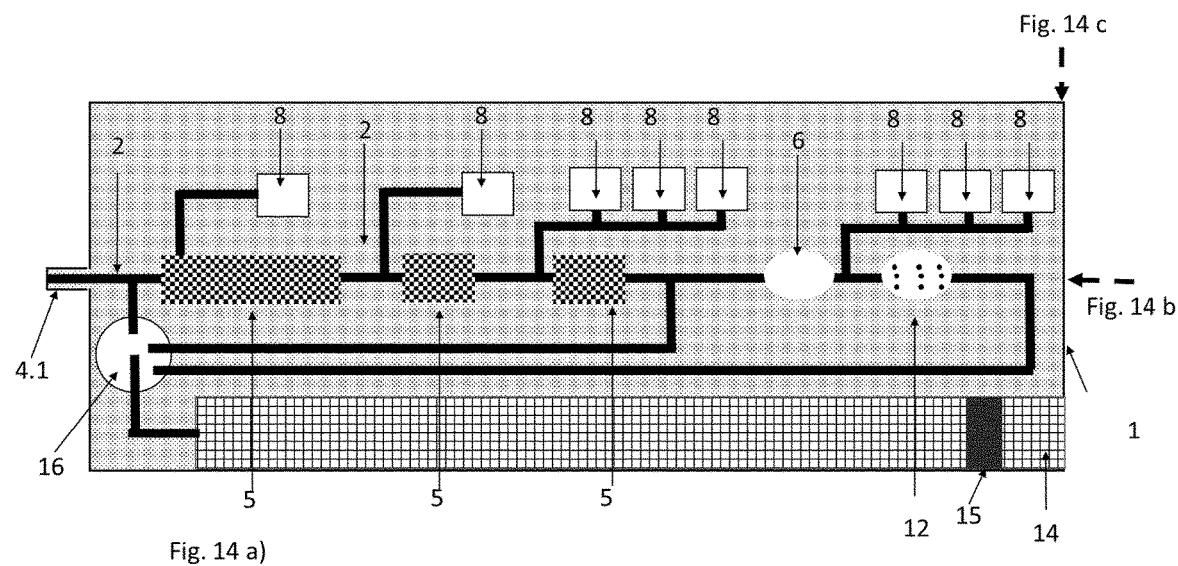
FIG. 14a shows a fourteenth embodiment of the microfluidic device according to the invention in a top view.
FIG. 14b shows a fourteenth embodiment of the microfluidic device according to the invention in cross-section 1.
FIG. 14c shows a fourteenth embodiment of the microfluidic device according to the invention in cross-section 2.
Figure 14:
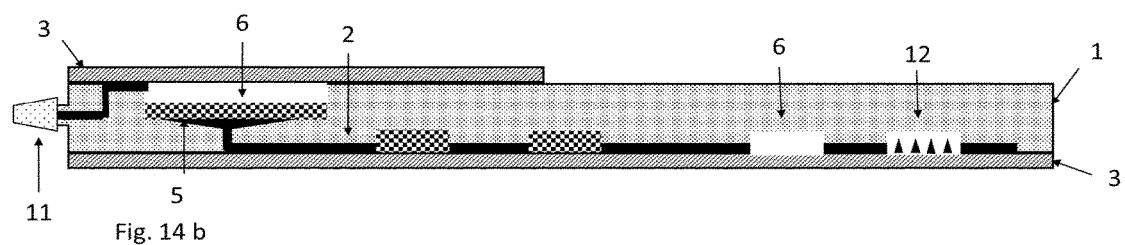
Figure 14:
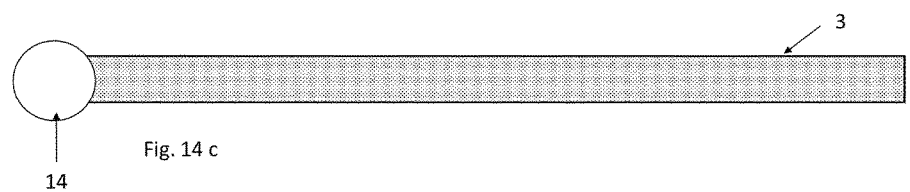
Figure 15:
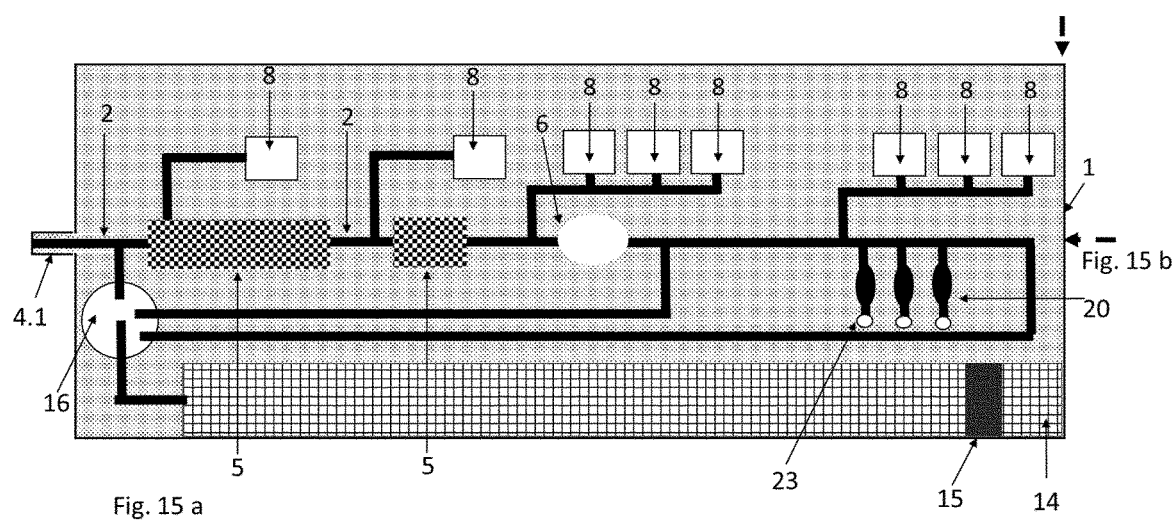
FIG. 15a shows a fifteenth embodiment of the microfluidic device according to the invention in a top view.
FIG. 15b shows a fifteenth embodiment of the microfluidic device according to the invention in cross-section 1.
FIG. 15c shows a fourteenth embodiment of the microfluidic device according to the invention in cross-section 2.
Figure 15:
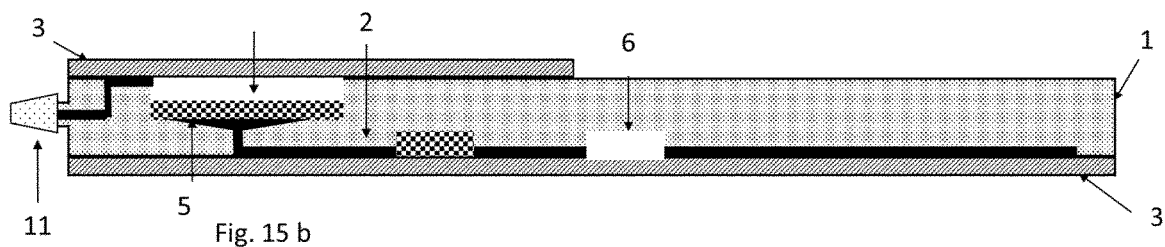
Figure 15:
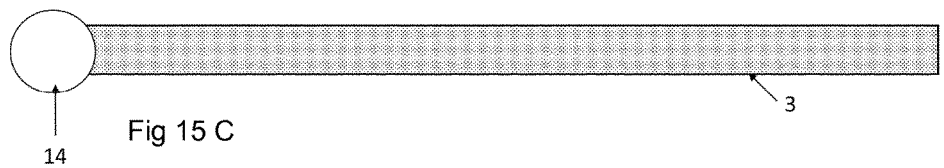

The embodiment according to FIGS. 15*a*-15*c* includes a fluidic system similar to the embodiment according to FIG. 14, which includes in place of a reaction chamber or detection chamber 12 with a downstream reagent array as shown in FIG. 14*a*, a plurality of parallel reaction chambers 20, which can be used for PCR (polymerase chain reaction), real time PCR, quantitative real time PCR (qPCR) or a combined reverse transcription with PCR (PCR, real time PCR, qPCR). The filling of the chambers 20 is performed in parallel or successively and is achieved by venting at the end of this fluidic network area through a gas permeable membrane 23. Alternatively, a closed air reservoir can be used due to the compressibility of the air, Boyle-Mariotte effect. Reagents may be present in the channel system 2 as well as in the reaction chambers 6.

Figure 16:
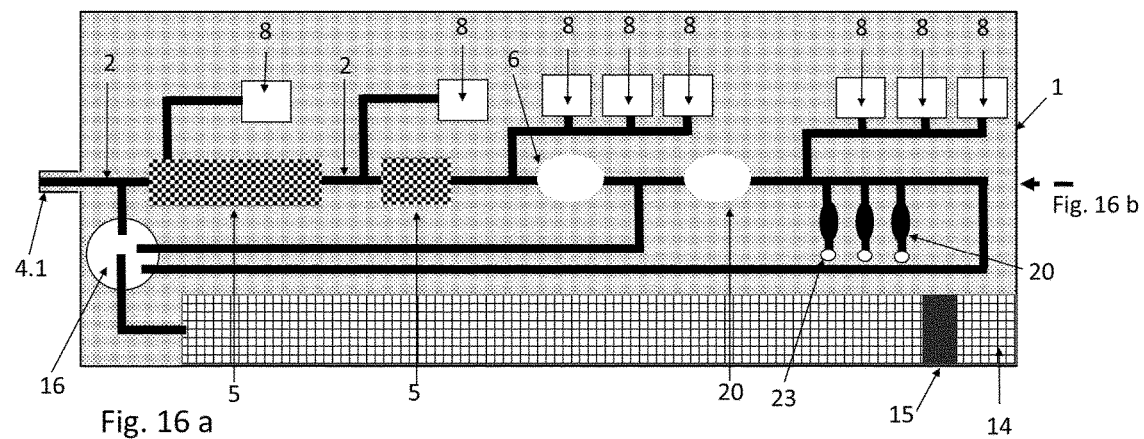
FIG. 16a shows a sixteenth embodiment of the microfluidic device according to the invention in a top view.
FIG. 16b shows a sixteenth embodiment of the microfluidic device according to the invention in cross-section 1.
Figure 16:
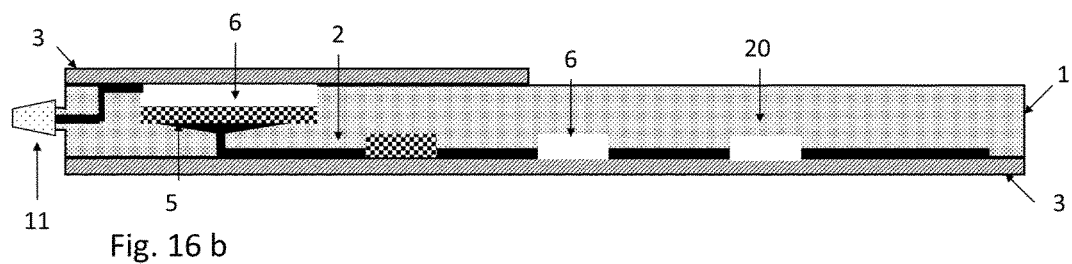

The embodiment as shown in FIGS. 16*a*, 16*b* includes an additional chamber 20, which may include reagents, preferably reagents for PCR or reverse transcription.

In the embodiments shown in the previous figures, 20 reagents can be stored in one or more of the chambers 6 and PCR chambers, especially dry reagents for reverse transcription or PCR (RT-PCR, qPCR, PCR).

Figure 17:
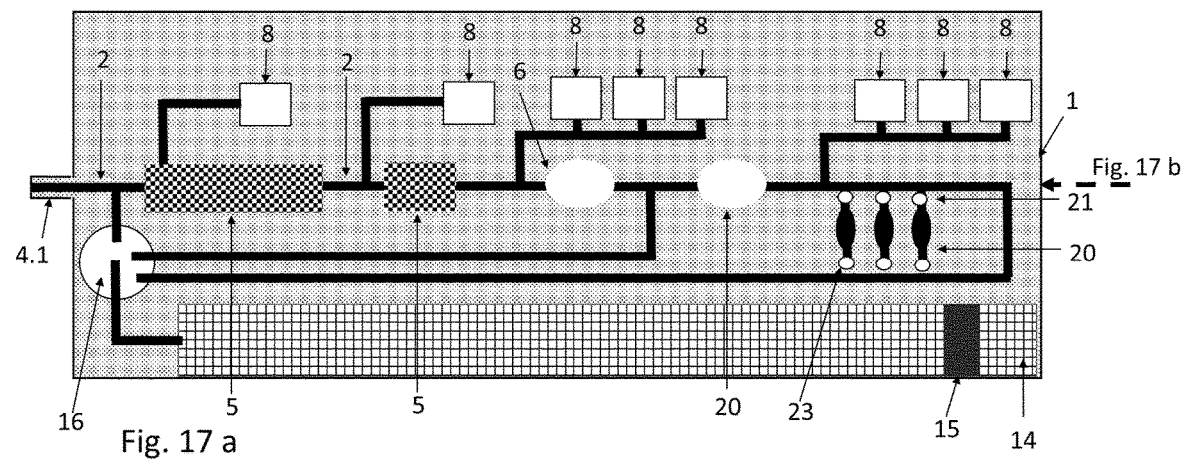
FIG. 17a shows a seventeenth embodiment of the microfluidic device according to the invention in a top view.
FIG. 17b shows a seventeenth embodiment of the microfluidic device according to the invention in cross-section 1.
Figure 17:
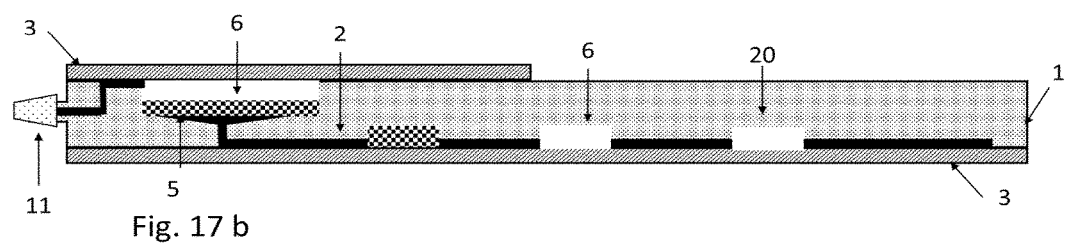

The embodiment as shown in FIGS. 17*a*, 17*b* additionally includes the option of closing the PCR chamber 20 with one membrane valve 21 each, which is particularly advantageous for keeping the fluids in the PCR chamber 20 even at high temperatures.

Figure 18:
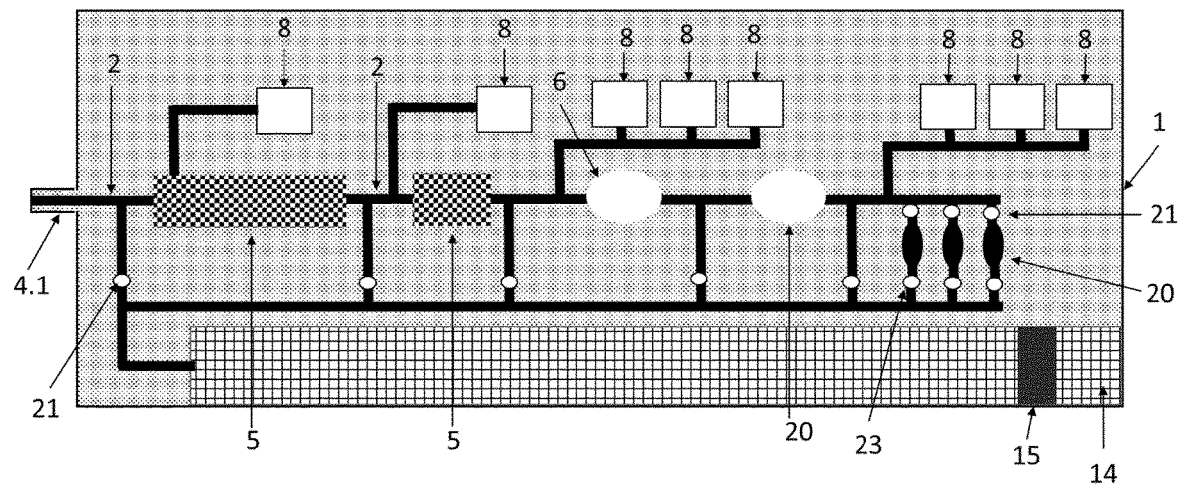
FIG. 18a shows an eighteenth embodiment of the microfluidic device according to the invention in a top view.

The embodiment according to FIG. 18*a* includes exemplarily a series of membrane valves 21, which provide the fluid control in the fluidic system and are arranged at different positions in the channel system 2, in order to close parts of the channel system 2 and thus make a control of the fluid flow possible within the microfluidic device.

Figure 19:
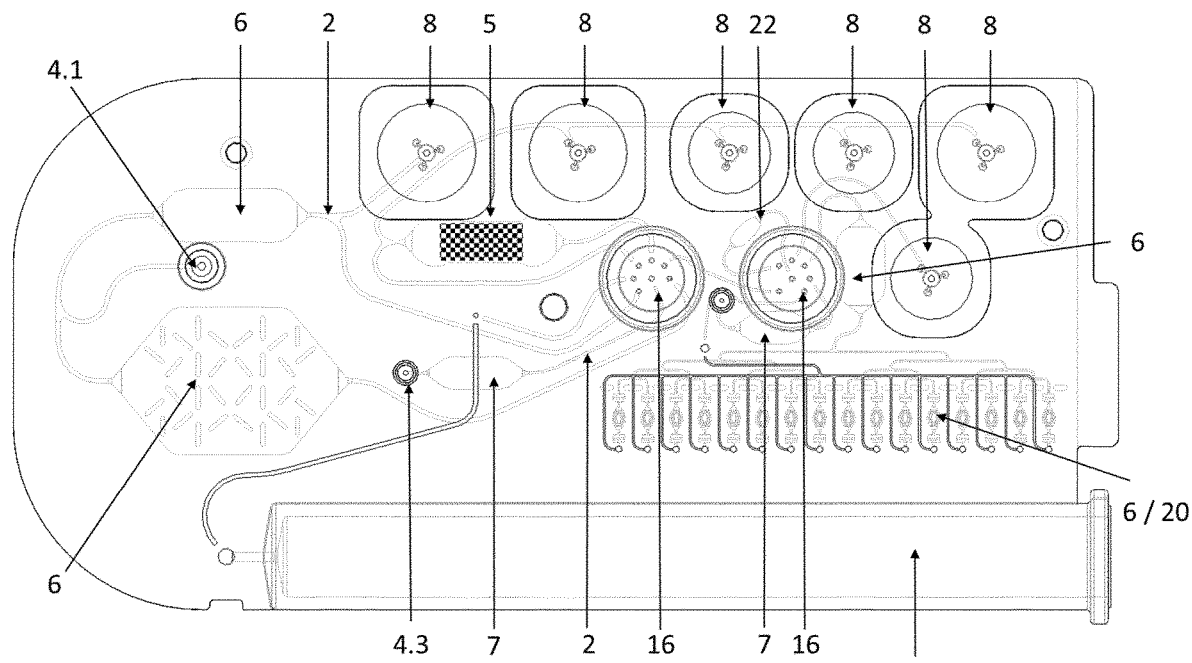
FIG. 19 shows a nineteenth embodiment of the microfluidic device according to the invention in a top view.

The embodiment shown in FIG. 19 has a series of functional elements that sequentially process the sample from the fluid inlet. The sample is supplied into the fluid inlet 4.1 and then enters a reaction chamber 6, which can include mixing elements and reagents and into which fluid can be added from the reagent reservoirs 8 for reacting with the sample.

Via the rotary valves 16, this mixture reaches the functional element 5 in order to obtain the purified target molecules by flowing with different fluids from the reagent reservoirs 8, whose volume can then be measured via the measuring loops 22 at the second rotary valve 16 and which can then each reach the next reaction chamber 6 with a defined volume, in which dry or fluid reagents may be present. This mixture then passes into the parallel reaction cavities 6, which can be used for a PCR (qPCR, RT-PCR, PCR), for example. Fluid control is performed by the syringe pump 14, the rotary valves 16 and the selective emptying of the reagent reservoirs 8.

The embodiment according to FIG. 19 can be used in such a way that the outlet channels and/or the inlet channels from the reaction/PCR chambers 20 are sealed by a sealing method, e.g. by welding, heat sealing or pressure, so that the fluids remain in the chambers 20 even during the temperature cycles of a PCR.

In a method according to FIG. 19, a sample including nucleic acid is sucked into the reaction chamber 6 via the fluidic interface 4.1 using the integrated syringe pump 14. In this reaction chamber 6 the sample is mixed with lysis buffer from the reagent reservoirs 8 and actively lysed. The sample lysate is sucked through the element by the integrated syringe pump 14 via the rotary valve 16. Furthermore, the sample in functional element 5 is purified by washing buffer from the reagent reservoirs 8 so that clean nucleic acid remains in functional element 5. Excess sample and washing buffer are sucked into the syringe pump 14 and remain in it as waste. A displacement buffer from the reagent reservoirs 8 removes the remaining components of the washing buffers and then floods them with the elution buffer from the reagent reservoirs 8. After incubation of the elution buffer in the functional element 5, it is pumped by pressure from the remaining reagent reservoirs via the rotary valve 16 into the measuring loop 22, thus placing the desired volume exactly in the fluidic channel system 2. A waste structure 7 provided with a vent serves as overflow for the excess eluate. The nucleic acid eluate is then rinsed out of the measuring loop 22 with PCR reagent or buffer from the reagent reservoir 8 and transported to the reaction chamber 6. This may include dried PCR reagents, which are suspended in the reaction chamber 6. By further pressure from the reagent reservoirs 8, the mixture of eluate and PCR reagent is pressed via the rotary valve 16 into the PCR/qPCR/RT-PCR chambers 6/20 and these are homogeneously flooded. The PCR chambers 6/20 can then be thermally sealed at the chamber inlet and outlet in a preferred variant, and then the temperature cycle with amplification and optical detection takes place.

A preferred variant is the isothermal amplification of the nucleic acid.

In another preferred variant, the purified nucleic acid is RNA that undergoes reverse transcription before amplification.

The microfluidic device or fluidic functional unit according to the invention can be used as an independent component, but at the same time it can also be part of an extended fluidic network. This is especially the case with microfluidic chips, which cover further functions and the microfluidic device and the methods for its operation according to the invention cover only partial areas.

Fluidic interfaces are elements that can be used for the introduction or discharge of media, for venting, closing or opening to apply pressure or negative pressure and also for connection to interfaces of a device or for use by a manual operator. These fluidic interfaces can have any shape, for example as holes, recesses, Mini Luer-, Luer-, Luer-Lok-, olive connections or other geometries and, in the case of a venting variant, can be sealed with gas-permeable but fluid-tight components, e.g. gas-permeable membranes.

The closure of fluidic interfaces can generally be achieved by additional elements such as caps, or by using valves on the functional element in the form of membrane valves, rotary valves or passive valves, e.g. via channel tapers, or surface modifications of the base material. The valves are usually operated by a corresponding operating device, alternatively manual operation is possible for some embodiments.

The elements (filters, membranes, frits, paper or similar elements) can be connected directly to the structured element during the manufacturing process of the structured element, for example as insert parts in injection molding or subsequently inserted.

The parts of the fluidic network described as cavity 6, 7 can be configured as chamber, channel, etc. and do not necessarily differ in the geometric dimensions before or after this chamber, e.g. the channel cross-sections.

The reagent reservoirs 8 shown in the different embodiments can also be configured as fluidic interfaces and can be fed via external reagent reservoirs, e.g. from an operating device.

Fluid transport on the functional element can be achieved by external pressure or vacuum, pressurization of reagent reservoirs, integrated pump valves, surface forces, capillary forces, etc.

The present invention describes a microfluidic device with a fluidic system having at least one fluidic interface and at least one inserted porous functional element through which a sample is passed and through which further fluid s or gases can subsequently be directed. The whole device comprises at least one structured component and at least one component applied to the structured component as well as the preferably porous functional element.

The functional unit according to the invention provides the separation, purification, fractionation and concentration of components.

Preferred embodiments of the functional unit include a plurality of functional elements and also have fluid reservoirs on the microfluidic device.

According to the invention, the microfluidic device is to be operated with a corresponding method.

The system can be operated manually or by means of simple devices or equipment.

If one speaks of a PCR chamber 20, this can be synonymous with a chamber for the various forms of PCR, such as real-time PCR, quantitative PCR, combined reverse transcription, reverse transcription or even isothermal methods of amplifying nucleic acids such as NASBA, RCT, etc.

1 structured part/structured component
2 fluidic network/channel system
3 component
4 fluidic interface
4.1 fluidic interface—inlet
4.2 fluidic interface—outlet
4.3 fluidic interface—e.g. outlet for waste, venting
5 functional element/porous element (filter/membrane/frit/paper or similar element)
6 cavity/reaction chamber—component of the fluidic system/channel system
7 cavity/waste chamber
8 reagent reservoir/e.g. blister
9 blister seat
10 piercing element
11 cap
12 detection area
13 measuring field
14 body of syringe pump
15 plunger of syringe pump
16 rotary valve
17 rotary valve seat
18 rotary valve body 19 rotary valve cap
20 PCR/qPCR/RT-PCR chamber
21 membrane valve
22 volume measuring element (measuring loop)
23 venting membrane

The invention claimed is:

1. A microfluidic device, comprising:
a structured component (1) formed as a flat body,
a microfluidic channel system (2) formed in the structured component (1),
at least one component (3), which is applied to a surface of a top side and/or a bottom side of the structured component (1) in order to seal the microfluidic channel system (2),
at least one porous functional element (5),
a fluidic reservoir (8), in which fluidic reagents are stored, and
at least one fluidic interface (4.1, 4.2, 4.3), which is arranged at an external surface of the structured component (1) for the supply of media into the microfluidic channel system (2); and
which includes reagents and/or dry reagents provided in at least one reaction chamber (6) and/or in at least one PCR chamber (20),
wherein the at least one porous functional element (5) is in fluid communication with the at least one fluidic interface (4.1, 4.2, 4.3) and the fluidic reservoir (8) through the microfluidic channel system (2), and in response to the fluid communication, the at least one porous functional element (5) is configured to be flowed through in any order by the media supplied via the at least one fluidic interface (4.1, 4.2, 4.3) as well as by the fluidic reagents stored in the fluidic reservoir (8).

2. The microfluidic device according to claim 1, further comprising: at least one of a channel taper, a valve, a switch, a distributor, a rotary valve, a venting membrane, and/or a waste chamber (7), or a combination thereof.

3. A method for the purification of nucleic acids in the microfluidic device according to claim 2, the method comprising supplying a sample via-a first fluidic interface (4.1) of the at least one fluidic interface-; filtering the sample by the at least one porous functional element (5), so that cells of the sample remain behind and undesired components enter the waste chamber (7) to which a fluidic interface of the at least one fluidic interface is opened by closing a second fluidic interface (4.3) and a third fluidic interface (4.2) of the at least one fluidic interface downstream of a second porous functional element (5) in the flow direction; lysing the cells by contact of the cells with reagents in the at least one reaction chamber (6) above a first porous functional element (5); transporting the cells by fluids from one of the fluidic reservoirs (8) connected to the first porous functional element (5); transporting the cells to the second porous functional element (5), wherein the second fluidic interface (4.3) disposed behind the second porous functional element (5) is opened and any other fluidic interface (4.1, 4.2) of the at least one fluidic interface are closed, wherein a binding of target molecules and undesired molecules to the second porous functional element (5) and a separating of the undesired molecules by flushing with fluids from the fluidic reservoir (8) occurs, and subsequent to closing the second fluidic interface (4.3) and opening of the third fluid interface (4.2), of the at least one fluid interface, each of a releasing of nucleic acids by a reagent and an expelling and removing of an eluate from the third fluidic interface (4.2) occurs.

4. The method for the purification of nucleic acids according to claim 3, wherein the nucleic acid is DNA or the nucleic acid is RNA.

5. The microfluidic device according to claim 1, wherein the at least one component (3) has at least partially transparent and/or at least partially light-tight regions and/or the at least one component (3) is formed as a film which is glued to the top side and/or the bottom side of the structured component (1).

6. The microfluidic device according to claim 1, wherein at least two fluidic interfaces (4.1, 4.2, 4.3) are arranged at the structured component (1), wherein at least one of the fluidic interfaces (4.1, 4.2, 4.3) is arranged vertically, horizontally and/or at any angle to a flow direction of the microfluidic channel system (2) and/or to a surface of the structured component (1) of the microfluidic device, wherein the at least one fluidic interface (4.1, 4.2, 4.3) is provided for media supply, sample supply, media addition and/or the application of positive or negative pressure and/or for venting.

7. The microfluidic device according to claim 1, wherein the at least one fluidic interface (4.1, 4.2, 4.3) and/or the microfluidic channel system (2) and/or parts of the microfluidic channel system (2) is/are closed by at least one integrated valve, by at least one external switch or at least one valve and/or at least one cap (11), wherein the at least one integrated valve and/or the at least one valve are configured as membrane valves or rotary valves and/or at least one syringe pump (14) with associated plunger (15) and/or piston is integrated.

8. The microfluidic device according to claim 1, wherein the microfluidic channel system (2) is fluidically controllable by means of at least one rotary valve (16) and channels are connected via the at least one rotary valve (16) in order to enable opening and closing of the microfluidic channel system (2) and/or measurement of volumes via measuring loops (22) and/or the microfluidic channel system (2) is fluidically controllable by the at least one rotary valve (16) and membrane valves (21), wherein the at least one rotary valve and membrane valves enable opening and/or closing of a part of the microfluidic channel system (2) and/or in which a fluid flow in the microfluidic channel system (2) is controllable by membrane valves (21), wherein the membrane valves enable opening or closing of a channel.

9. The microfluidic device according to claim 1, wherein a complete master mix including primers or primers and probes is provided in the at least one PCR chamber (20) in the flow direction downstream of the at least one porous functional element (5), wherein parallel PCR chambers (20) include different primers, or
wherein a master mix without primer and probes is provided in one of the at least one reaction chamber (6) in the flow direction downstream of the at least one porous functional element (5), and subsequent parallel PCR chambers (20) in the flow direction downstream of the at least one reaction chamber (6) include different primers or primers and probes.

10. The microfluidic device according to claim 9, wherein one of the at least one reaction chamber (6) in the flow direction downstream of the at least one porous functional element (5) is provided with the reagents for reverse transcription and the subsequent parallel PCR chambers (20) in the flow direction downstream of the at least one reaction chamber (6) include the different primers or primers and probes with the master mix.

11. The microfluidic device according to claim 9, wherein one of the at least one reaction chamber (6) in the flow direction downstream of the at least one porous functional element (5) includes the reagents for reverse transcription, as well as the master mix for PCR without primers or primers and probes, and the subsequent parallel PCR chambers (20) in the flow direction downstream of the at least one reaction chamber (6) include the different primers or primers and probes; or the one of the at least one reaction chamber (6) in the flow direction downstream of the at least one porous functional element (5) is provided with the reagents for a reverse transcription, in a subsequent reaction chamber the master mix for the PCR is provided without primers or primers and probes and the subsequent parallel PCR chambers (20) in the flow direction downstream of the at least one reaction chamber (6) include different primers or primers and probes; or the one of the at least one reaction chamber (6) in the flow direction downstream of the at least one porous functional element (5) includes the reagents for a reverse transcription as well as the master mix for the PCR without primers or primers and probes and the subsequent parallel PCR chambers (20) in the flow direction downstream of the at least one reaction chamber (6) include different primers or primers and probes.

12. The microfluidic device according to claim 1, wherein the microfluidic device is provided for the separation, purification, fractionation and/or concentration of components of a supplied medium or a sample and/or intermediate reaction steps are carried out in the microfluidic device by addition of reagents in order to obtain, separate and/or concentrate target molecules, wherein the target molecules are nucleic acids.

13. The microfluidic device according to claim 1, wherein the microfluidic device has a plurality of porous functional elements (5) and/or one or more fluid reservoirs which are connected upstream of and/or between the plurality of porous functional elements (5), wherein a first porous functional element (5) is provided for the generation of plasma or serum from blood and a second porous functional element (5) is provided which is connected downstream of the first porous functional element (5) and configured to remove hemolyzed red blood cells.

14. A method for processing a blood sample with the microfluidic device according to claim 1, comprising supplying the sample to a first porous functional element of the at least one porous functional element (5), the first porous functional element generating plasma or serum from the blood sample and, removing hemolyzed red blood corpuscles via a second porous functional element of the at least one porous functional element (5), which is connected downstream of the first porous functional element.

15. A method for the purification of nucleic acids in the microfluidic device according to claim 1, the method comprising supplying a sample via a first fluidic interface (4,1), of the at least one fluidic interface,-and adding reagents in the at least one reaction chamber (6), the at least one reaction chamber (6) lysing cells present in the sample;

passing the sample over the at least one porous functional element (5), while a second fluidic interface (4.2), of the at least one fluidic interface, is closed and undesired molecules either enter a waste reservoir (7) directly with the sample, or separating the undesired molecules by flushing the at least one porous functional element (5) with reagents from a plurality of fluid reservoirs (8), while target molecules and nucleic acids remain at the at least one porous functional element (5); and removing the nucleic acids by a special reagent from one of the fluid reservoirs (8), wherein a third fluidic interface (4.4), of the at least one fluidic interface, at the waste reservoir (7) is closed and the second fluidic interface (4.2) is opened in advance, and the nucleic acids are removed from the microfluidic channel system (2) via the opened second fluidic interface (4.2).

16. The method for the purification of nucleic acids according to claim 15, wherein the nucleic acids are DNA.

17. The method for the purification of nucleic acids according to claim 15, wherein the nucleic acids are RNA.

18. The method according to claim 15, wherein a purified nucleic acid is subjected to subsequent amplification and detection; and/or wherein the nucleic acid is an RNA, and is subsequently subjected first to reverse transcription and then to amplification and detection; and/or wherein all reagents are provided in fluid or dry form on the microfluidic channel system (2); and/or wherein the nucleic acid is a DNA and is amplified and detected by qPCR; and/or wherein the nucleic acid is a DNA and is amplified and detected by isothermal amplification; and/or wherein the nucleic acid is a DNA, which is pre-amplified in a first chamber of the at least one PCR chamber (20) by means of a non-specific PCR and subsequently detected in a specific qPCR; and/or wherein the nucleic acid is an RNA, which is subjected to reverse transcription in a first chamber of the at least one PCR chamber (20), and amplified and detected in a second chamber of the at least one PCR chamber (20) by means of qPCR; and/or wherein the nucleic acid is an RNA, which is subjected in the at least one PCR chamber (20) to both reverse transcription and qPCR (one-step RT-PCR); and/or wherein a plurality of parallel qPCR chambers (20) are provided for running the qPCR in parallel PCR chambers; and/or wherein the qPCR is a duplex PCR with internal control amplification; and/or wherein the qPCR is a multiplex PCR with internal control amplification; and/or wherein it is a conventional PCR, which is optionally subsequently detected via an array by hybridization.

* * * * *